(12) United States Patent
Fernandez De Mendiola Quintana et al.

(10) Patent No.: US 8,568,843 B2
(45) Date of Patent: Oct. 29, 2013

(54) TUBE MADE OF FLEXIBLE MATERIAL, PROCEDURE FOR THE MANUFACTURE OF TUBES MADE OF FLEXIBLE MATERIAL, AND THE FORMULATION USED

(75) Inventors: Javier Fernandez De Mendiola Quintana, Vitoria (ES); Juan Ignacio Valpuesta Landa, Vitoria (ES); Patxi Joseba Iriondo Cendoya, Vitoria (ES)

(73) Assignee: CTL-TH Packaging, S.L. Unipersonal, Minano (Alava) (ES)

( * ) Notice: Subject to any disclaimer, the term of this patent is extended or adjusted under 35 U.S.C. 154(b) by 0 days.

(21) Appl. No.: 13/697,700

(22) PCT Filed: May 6, 2011

(86) PCT No.: PCT/ES2011/000151
§ 371 (c)(1), (2), (4) Date: Nov. 13, 2012

(87) PCT Pub. No.: WO2011/141592
PCT Pub. Date: Nov. 17, 2011

(65) Prior Publication Data
US 2013/0065006 A1 Mar. 14, 2013

(30) Foreign Application Priority Data
May 10, 2010 (ES) .................................. 201000598

(51) Int. Cl.
*B29D 22/00* (2006.01)
(52) U.S. Cl.
USPC ..... 428/35.7; 428/36.9; 525/240; 264/328.17
(58) Field of Classification Search
USPC ............. 428/36.9, 35.7; 525/240; 264/328.17
See application file for complete search history.

(56) References Cited

U.S. PATENT DOCUMENTS

| 6,977,105 | B1 * | 12/2005 | Fujieda et al. | 428/36.9 |
|---|---|---|---|---|
| 7,279,526 | B2 * | 10/2007 | Malm et al. | 525/191 |
| 7,629,416 | B2 * | 12/2009 | Li et al. | 525/191 |
| 8,003,725 | B2 * | 8/2011 | Chapman et al. | 524/425 |
| 8,044,144 | B2 * | 10/2011 | Endoh et al. | 525/323 |
| 8,153,736 | B2 * | 4/2012 | Musgrave et al. | 526/160 |
| 8,450,416 | B2 * | 5/2013 | Gahleitner et al. | 525/92 G |
| 2010/0040813 | A1 | 2/2010 | Wada et al. | |
| 2013/0065006 | A1 * | 3/2013 | Fernandez De Mendiola Quintana et al. | 428/36.9 |

FOREIGN PATENT DOCUMENTS

| EP | 2 042 552 | 4/2009 |
|---|---|---|
| JP | 2003 096263 | 4/2003 |
| WO | 03/046021 | 6/2003 |
| WO | 2004/101673 A2 | 11/2004 |
| WO | 2010/051468 | 5/2010 |

* cited by examiner

Primary Examiner — N. Edwards
(74) Attorney, Agent, or Firm — Browdy + Neimark, PLLC

(57) ABSTRACT

Tube made of flexible manufactured material and a procedure for its manufacture, where all or part of the tube is manufactured by the injection molding of a formulation of plastic materials, which comprises at least one base Random-type polypropylene with an E modulus of between 300 and 1400 MPa, at least another Random-type polypropylene, with a melt flow of between 8 and 75 MFI 230/2.16, at least one copolymer with a modulus of between 10 and 500 MPa, at least one nucleating agent and/or at least one thermal stabilizer. The resulting tube fulfills diverse requirements for flexibility, permeability, welding capacity, mechanical resistance to low temperatures, etc.

13 Claims, No Drawings

TUBE MADE OF FLEXIBLE MATERIAL, PROCEDURE FOR THE MANUFACTURE OF TUBES MADE OF FLEXIBLE MATERIAL, AND THE FORMULATION USED

TECHNICAL FIELD

The invention relates to a tube made of flexible material, and to a procedure for the manufacture of said tube, where all or part of the tube is manufactured by the injection of a formulation of plastic materials. The invention also refers to the formulation of the materials used.

PRIOR ART

The use of tubes made of flexible material for storing pharmaceutical, cosmetic and food products etc is widely known in the market. Said tubes are generally provided with a body that is more or less elongated and inside which the product in question is stored, and with a head that closes the tube and which presents an outlet hole for removing the product. The tube may comprise other elements such as a cap that closes the head, and decorative elements that adorn the tube and/or provide information for the user (for example, in the form of labels applied onto the tube, printed messages or printed decorative elements).

There are many different procedures for the manufacture of tubes made of flexible material. There is an increasing tendency, however, for said procedures to be based on the manufacture of all or part of the tube by plastic injection moulding. For example, by means of one known procedure the tube is manufactured by first of all extruding the body and then over-injecting the head on to it. Another known procedure, described in WO2005072931, involves the initial manufacture of the body of the tube by injection moulding and the subsequent over-injection of the head of the tube. In another known procedure, detailed in WO2006082255, the body and a portion of the head are manufactured in the first place, and the entire head of the tube is then over-injected. In yet another example, explained in WO2009147254, the body of the tube is manufactured together with an appendage; in a further step, the appendage and, optionally, part of the body is cut so that the remaining body acquires the required size. The head of the tube is then over-injected.

As regards the materials used in procedures for the manufacture of tubes made of flexible material where all or part of the tube is manufactured by injection moulding, a large number of proposals are known; however, it is noted that said proposals usually seek to fulfill some requirements pertaining to the injected tube and fail to fulfill others. For example, U.S. Pat. No. 6,124,008 presents a mixture of ethylene-derived polymers with the object of guaranteeing the stress cracking of the container, although said mixture of polymers does not take into consideration the permeability and processability (industrial applicability) requirements of the container. Other cases involve polymer mixtures that seek to solve the issue of processability along with resistance to cracking but which overlook the issues of permeability and the container's welding capacity (this is due to the fact that materials or mixtures of materials with a high melt flow index achieve proper processability due to this characteristic, although their welding capacity is insufficient).

In other words, with regard to the materials used in the manufacture of tubes made of flexible material by injection moulding, it is generally found that the formulations used until nowadays are not ideal. In most cases they seek only to achieve a certain processability (which depends on the melt flow index of the formulation), a certain flexibility (which depends on the formulation density or module) or a certain resistance to stress cracking. In doing so, they fail to fulfill other requirements as important to the tubes as permeability, welding capacity (which is necessary for the body of the tube to close correctly and to ensure the product stored inside it does not leak), mechanical resistance to low temperatures, etc.

It is an objective of this invention to propose a formulation of materials for the manufacture of the injection-moulded tube, in other words of a tube made of flexible material that, either in part or entirely, is manufactured by plastic injection moulding. The formulation of materials should be processable, i.e. industrially applicable, and should fulfill the physical/chemical requirements of the injected tubes: flexibility, permeability, welding capacity and mechanical resistance to low temperatures, to name but a few.

BRIEF DESCRIPTION OF THE INVENTION

It is an object of this invention to provide a tube made of flexible material manufactured entirely or in part by the injection moulding of a formulation of plastic materials (and, optionally, other materials), and the procedure for the manufacture of said tube. As a result a tube is obtained that fulfils diverse requirements with regard to flexibility, permeability, welding capacity, mechanical resistance to low temperatures etc. The formulation comprises at least one base Random-type polypropylene with an E modulus (elasticity modulus) of between 300 and 1400 MPa, with the purpose of ensuring minimum levels of flexibility, weldability and impermeability to steam in the tube; at least another Random-type polypropylene, with a melt flow of between 8 and 75 MFI 230/2.16, with the purpose of improving the processability of the manufacture of the tube; at least one copolymer with a modulus of between 10 and 500 MPa, with the purpose of improving the tube's flexibility and mechanical properties at low temperatures; one or more nucleating agents to aid the crystallisation of the material, improve the processability of the tube and clarify the final mixture; and one or more thermal stabilisers, to prevent the material from degrading during the injection-moulding process as a result of high processing temperatures.

DETAILED DESCRIPTION OF THE INVENTION

The invention relates to a tube made of flexible material, made by any manufacturing process or formed by resulting parts, with the specific feature that at least part of the tube is manufactured by the injection moulding of a formulation of plastic materials. According to the invention, said formulation comprises:

a) between 20 and 80 parts of at least one base Random-type polypropylene with an E modulus (elasticity modulus) of between 300 and 1400 MPa (preferably between 400 and 1000 MPa and, in a particularly advantageous manner, between 600 and 800 MPa), for the purpose of ensuring minimum levels of flexibility, weldability and impermeability to steam in the tube;

b) between 20 and 80 parts of at least another Random-type polypropylene, with a melt flow of between 8 and 75 g/10 min MFI 230/2.16, for the purpose of improving the processability of the manufacture of the tube; preferably polypropylene with a melt flow of between 15 and 50 g/10 min MFI 230/2.16 and, in an especially advantageous manner, between 25 and 35 g/10 min MFI 230/2.16 is used;

c) up to 70 parts of at least one copolymer with a modulus of between 10 and 500 MPa (preferably between 30 and 200 MPa), for the purpose of improving the tube's flexibility and mechanical properties at low temperatures, and resistance to stress cracking, without this resulting in a deterioration in the weldability and processability of the tube;

d) up to four parts of one or more nucleating agents to aid the crystallisation of the material, improve the processability of the tube and clarify the final mixture; an example of the nucleating agent is Millad® 3988 by Miliken Chemical;

e) up to four parts of one or more thermal stabilisers to prevent the material from degrading during the injection-moulding process as a result of high processing temperatures; an example of the thermal stabiliser is Irganox® 1010 by Ciba®.

The formulation may optionally contain up to 50 parts of one or more metallocene plastomers for the purpose of improving the tube's flexibility and the mechanical properties at low temperature of the tube, without this resulting in a deterioration of the weldability and processability of the tube. Some examples of metallocene elastomers are the branded products Affinity® by Dow Chemical Company or Exact® by Dex Plastomers.

The formulation may also comprise additives with aesthetic purposes, such as pigments and/or colourants, and additives protecting against ultraviolet light, such as UV filters and/or agents protecting against photo-oxidation.

As a result the tube manufactured entirely or in part by the injection moulding of a formulation of plastic materials according to the invention offers a satisfactory relationship between the following qualities or characteristics: steam permeability, welding capacity, flexibility of the container, processability, resistance to stress cracking and mechanical properties at low temperatures. The inventive tube is thus deemed to offer optimal performance.

In addition to said tube, the invention also claims the procedure for the manufacture of tubes made of flexible material, wherein it is manufactured by the injection moulding of all or part of the tubes made of flexible material, a formulation of plastic materials such as the one described being used in said injection moulding. The invention also claims said formulation.

The invention claimed is:

1. A tube made of flexible material, manufactured at least in part by the injection moulding of a formulation of plastic materials, characterised in that said formulation comprises:
    a) between 20 and 80 parts of at least one base Random-type polypropylene with an E modulus of between 300 and 1400 MPa,
    b) between 20 and 80 parts of at least another Random-type polypropylene, with a melt flow of between 8 and 75 MFI 230/2.16,
    c) up to 70 parts of at least one copolymer with a modulus of between 10 and 500 MPa,
    d) up to four parts of at least one nucleating agent, and
    e) up to four parts of at least one thermal stabiliser.

2. The tube according to claim 1, wherein the formulation comprises up to 50 parts of at least one metallocene plastomer.

3. The tube according to claim 1, wherein the base Random-type polypropylene has an E modulus of between 400 and 1000 MPa.

4. The tube according to claim 3, wherein the base Random-type polypropylene has an E modulus of between 600 and 800 MPa.

5. The tube according to claim 1, wherein the other Random-type polypropylene has a melt flow of between 15 and 50 g/10 min MFI 230/2.16.

6. The tube according to claim 5, wherein the other Random-type polypropylene has a melt flow of between 25 and 35 g/10 min MFI 230/2.16.

7. The tube according to claim 1, wherein the copolymer has a modulus of between 30 and 200 MPa.

8. The tube according to claim 1, wherein further comprising additives with aesthetic purposes.

9. The tube according to claim 8, wherein further comprising pigments and/or colourants.

10. The tube according to claim 1, wherein further comprising additives protecting against ultraviolet light.

11. The tube according to claim 10, wherein further comprising UV filters and/or agents protecting against photo-oxidation.

12. A method for manufacture of tubes made of flexible material, the method comprises manufacturing all or part of the tubes made of flexible material by injection moulding a formulation of plastic materials according to claim 1.

13. A formulation of materials according to claim 1.

* * * * *